US006177941B1

(12) United States Patent
Haynes et al.

(10) Patent No.: US 6,177,941 B1
(45) Date of Patent: Jan. 23, 2001

(54) REPRESENTATIVE MAPPING BETWEEN TOOLBARS AND MENU BAR PULLDOWNS

(75) Inventors: Thomas R. Haynes, Apex; Jerry T. Paradise, Durham; Christopher Hunt, Raleigh, all of NC (US)

(73) Assignee: International Business Machine Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/918,146

(22) Filed: Aug. 25, 1997

(51) Int. Cl.[7] ..................................... G06F 3/00
(52) U.S. Cl. ................................. 345/352; 345/354
(58) Field of Search .................. 345/352, 348, 345/326–340, 341–347, 349–351, 353–355, 356–357, 110–115, 102

(56) References Cited

U.S. PATENT DOCUMENTS

| | | | | |
|---|---|---|---|---|
| 5,432,903 | * | 7/1995 | Frid-Nielsen | 345/352 |
| 5,475,843 | * | 12/1995 | Halviatti et al. | 395/700 |
| 5,557,730 | * | 9/1996 | Frid-Nielsen | 345/352 |
| 5,636,920 | * | 6/1997 | Shur et al. | 364/410 |
| 5,644,737 | * | 7/1997 | Tuniman et al. | 345/352 |
| 5,740,444 | * | 4/1998 | Frid-Nielsen | 395/705 |
| 5,828,376 | * | 10/1998 | Solimene et al. | 345/352 |
| 5,867,162 | * | 2/1999 | O'Leary et al. | 345/352 |
| 5,963,659 | * | 10/1999 | Cahill et al. | 382/139 |
| 5,982,370 | * | 11/1999 | Kamper | 345/356 |
| 6,014,138 | * | 1/2000 | Cain et al. | 345/335 |

OTHER PUBLICATIONS

Litton PRC, "Windows NT 4.0 Basics and Guidebook for the NT Desktop," U.S.P.T.O, Arlington, VA, May, 1997.*
Simpson, *Windows 95 Uncut*, IDG Books Worldwide, Inc., Ca. pp. 64–67, Ch. 5, 1995.*

* cited by examiner

Primary Examiner—Steven Sax
(74) Attorney, Agent, or Firm—Anthony Magistrale; Andrew Dillon (57) ABSTRACT

A graphical user interface for a computer system has a toolbar with associated items and a menu bar having at least one pulldown menu with associated items, and provides a visual correspondence between items on the pulldown menu and items on the toolbar. The visual correspondence can be provided when a graphical pointer is placed over an item on the pulldown menu, and when a graphical pointer is placed over an item on the toolbar. The visual correspondence may be provided by highlighting the item on the toolbar, by providing a ghost image of the item on the toolbar, or by providing a ghost image of the pulldown menu. The invention retains current user interaction with toolbars and menu bars, and the novel dynamic linking of menu bar and toolbar items extends the functionality of the GUI without increasing visual complexity.

27 Claims, 6 Drawing Sheets

REPRESENTATIVE MAPPING BETWEEN TOOLBARS AND MENU BAR PULLDOWNS

BACKGROUND OF THE INVENTION

1. Field of the Invention

The present invention generally relates to computer systems, and more particularly to a graphical user interface providing a visual correspondence between an item on a pulldown menu and an item on a toolbar.

2. Description of the Related Art

Figure 1:
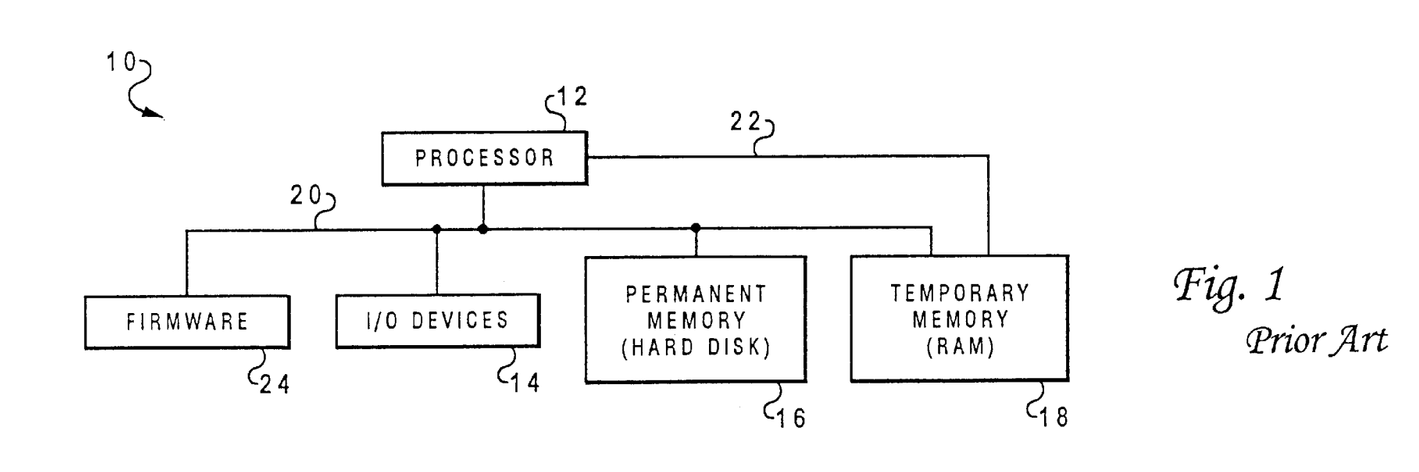
FIG. 1 is a block diagram of a conventional computer system.

The basic structure of a conventional computer system 10 is shown in FIG. 1. Computer system 10 has at least one central processing unit (CPU) or processor 12 which is connected to several peripheral devices, including input/output devices 14 (such as a display monitor, keyboard, and graphical pointing device) for the user interface, a permanent memory device 16 (such as a hard disk) for storing the computer's operating system and user programs, and a temporary memory device 18 (such as random access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor, and a memory controller may be used as an interface between temporary memory device 18 and processor 12. Computer system 10 also includes firmware 24 whose primary purpose is to seek out and load an operating system from one of the peripherals (usually permanent memory device 16) whenever the computer is first turned on.

Figure 2:
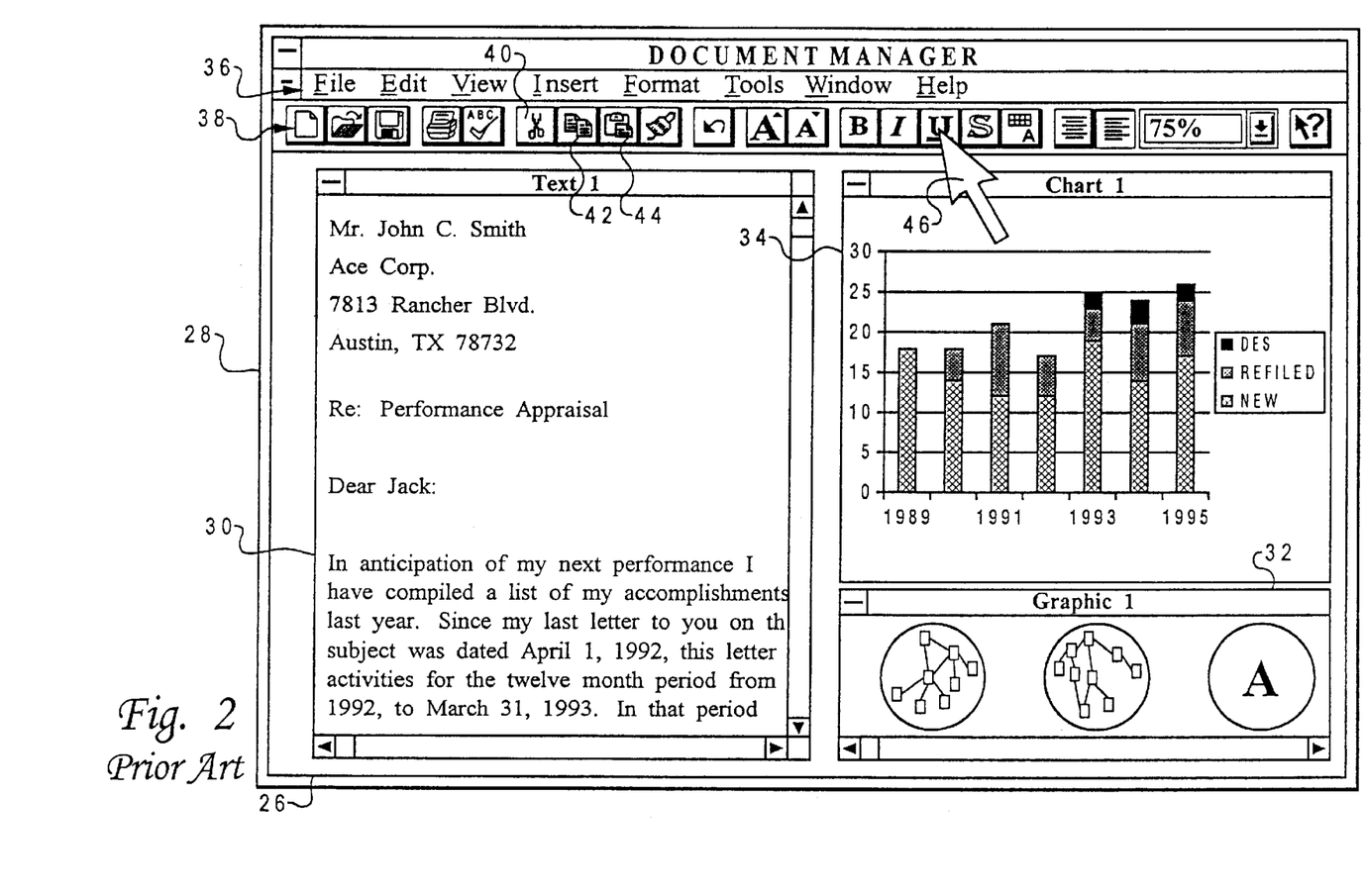
FIG. 2 is an illustration of a computer display showing a conventional graphical user interface (GUI) which employs a menu bar and a toolbar to allow simplified execution of program commands.

With further reference to FIG. 2, conventional computer systems often employ a graphical user interface (GUI) to present information to the user. In the example of FIG. 2, a generic application program entitled "Document Manager" is presented by the GUI as a primary application window (parent window) 26 on a display device (i.e., video monitor) 28. In this example, the application window has several secondary, enclosed windows (child windows) 30, 32 and 34 which depict the contents of various files that are handled by the program. A menu bar 36 with a standard set of commands, and a toolbar 38 may also be provided as part of the GUI, to simplify manipulation and control of the objects (e.g., text, charts and graphics) within the child windows. Toolbars can be provided as rows or columns, and have several buttons comprising textual icons, non-textual (graphic) icons, or icons having both graphic and textual elements. The depicted toolbar 38 includes, for example, three common edit-type buttons 40, 42 and 44 used respectively to "cut," "copy" and "paste" file objects. Each of these buttons can be easily selected using the graphical pointer 46 controlled by a pointing device (e.g., mouse) connected to the computer which is manually actuated.

Figure 3:
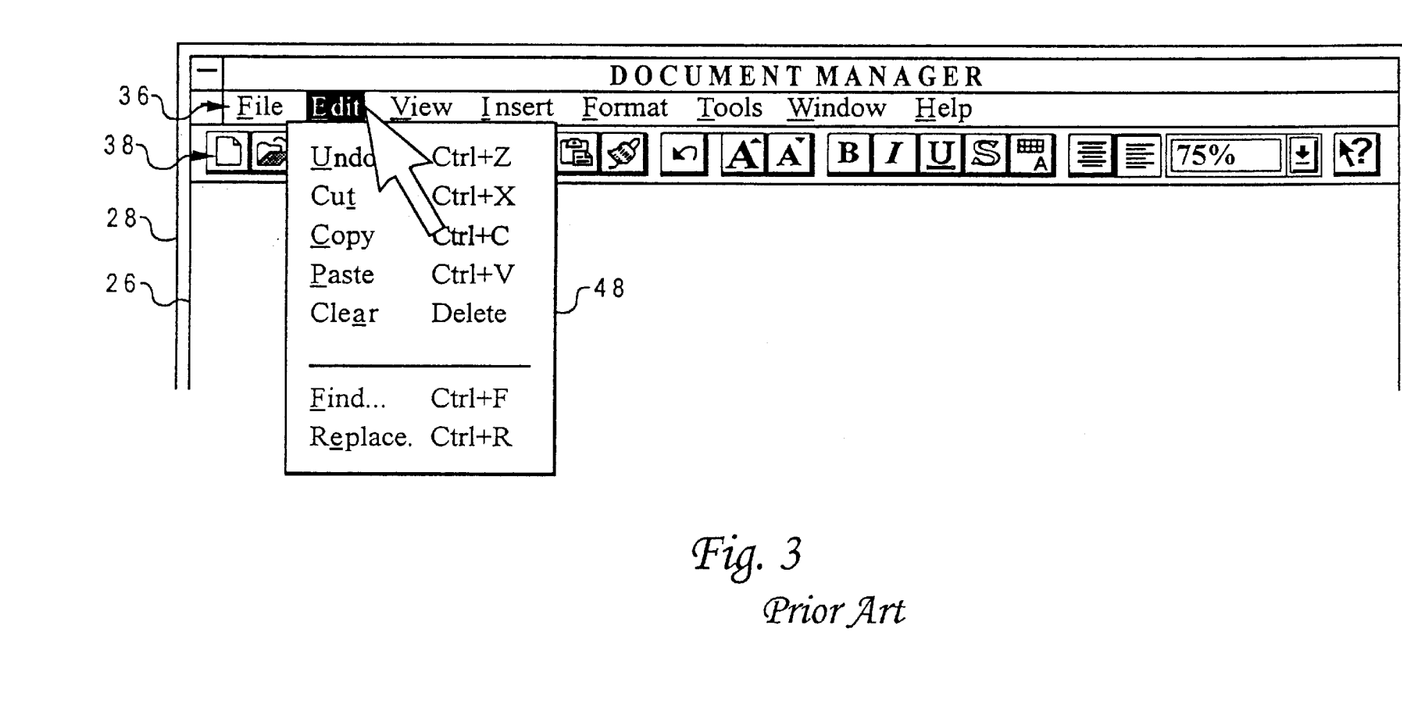
FIG. 3 is an illustration the GUI of FIG. 2 wherein a menu bar item has been selected, resulting in the display of a pulldown menu.

As further seen in FIG. 3, when a given item on the menu bar 36 is selected, the GUI displays a pulldown menu 48. A pulldown menu has several lines, and a given line can provide a single command or provide a link to a further pulldown menu. It is very common for there to be a one-to-one mapping between individual menu bar pulldowns and toolbar items. For instance, if the user selects the "Edit" feature on menu bar 36 (using either the pointing device or the keyboard), pulldown menu 48 is displayed, and includes pulldowns "Undo," "Cut," "Copy," "Paste," "Clear," "Find," and "Replace" (the underlined letters in these words correspond to the keystrokes on the keyboard which can be used to select the pulldowns while the pulldown menu is displayed). Of these seven pulldown items, three of them thus correspond to toolbar items; namely, the second, third and fourth lines respectively correspond to buttons 40, 42 and 44. The other four lines on pulldown menu 48 have no corresponding buttons in the depicted toolbar 38, although many application programs allow the user to customize toolbars to, e.g., add buttons for other pulldowns.

Pulldown menus and toolbars offer a simple and user-friendly way of executing special program commands. As shown in FIG. 3, a pulldown menu can offer even more user friendliness by indicating, on the corresponding lines, special keystrokes or keystroke combinations that can be used to select the pulldown commands even when the pulldown menu is not being displayed. However, when scanning the menu bar pulldowns, it is not apparent whether there are corresponding toolbar items and, if corresponding toolbar items do exist (and are displayed within the application window), there is no indication of where on the toolbar the items are. A similar problem is found in the reverse context, that is, when selecting a toolbar icon it is never apparent to the user that there is any corresponding menu bar pulldown item. This information would be useful in many cases, but quite often is not implemented unless the user is conscientious about reviewing the application program documentation, and remembers all of the toolbar-pulldown links. This problem can be mitigated by providing intuitive graphic symbols but, as the number of such icons proliferate it becomes more difficult to provide any meaningful correspondence between toolbar items and pulldowns. The "bubble help" feature of some programs allows a user to select a mode wherein, when the graphical pointer is placed over a toolbar button, a small conversation bubble appears on the screen with information about the button, but this increases the visual complexity of the user interface. Also, while the toolbar item could include more textual information which would make the corresponding pulldown more apparent, this approach is contrary to the compact design of toolbar buttons. It would, therefore, be desirable to devise a method of affording feedback to users that easily and intuitively provides knowledge of any mapping between an item on a pulldown menu and its corresponding item on a toolbar. It would be further advantageous if the method would retain current toolbar and pulldown behavior, but extend their functionality without increasing the visual complexity.

SUMMARY OF THE INVENTION

It is therefore one object of the present invention to provide an improved graphical user interface (GUI) having pulldown menus and toolbars.

It is another object of the present invention to provide such a GUI wherein a simple and intuitive linkage between a menu bar pulldown and a toolbar icon is provided.

It is yet another object of the present invention to provide such a linkage without increasing the visual complexity of the GUI.

The foregoing objects are achieved in a computer system generally comprising a display device, a processor, and means allowing the processor to cause the display device to depict a GUI including a window having a toolbar with associated items and a menu bar having at least one pulldown menu with associated items, the means further providing a visual correspondence between an item on the pulldown menu and an item on the toolbar. The means provides the visual correspondence when a graphical pointer is placed over an item on the pulldown menu, or when a graphical pointer is placed over an item on the toolbar. The visual correspondence may be provided by highlighting the item on the toolbar, by providing a ghost image of the item on the toolbar, or by providing a ghost image of the pulldown menu. The item on the toolbar can be highlighted by outlining it, or using other techniques such as color inversion, etc. A corresponding pulldown item in the ghost pulldown menu can also be highlighted. The present invention thereby retains current user interaction with toolbars and menu bars, and the dynamic linking of menu bar and toolbar items extends the functionality of the GUI without adding completely new visual elements. It can be toggled on and off for, e.g., a training mode to acquaint the user with toolbar/menu bar linkages. A "wizard" or subroutine can optionally be activated after the training mode to delete features that the user does not want to use, such as "cut" or "paste."

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

The present invention is directed to a computer system having graphical user interface (GUI) providing a visual correspondence between an item on a pulldown menu and an item on a toolbar. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense. The GUI of the present invention may further be adapted for use with existing operating systems such as OS/2 (a trademark of International Business Machines Corp.) or Windows 95 (a trademark of Microsoft Corp.). Users of these systems are accustomed to interfacing with toolbars and items selectable from menu bar pulldowns.

Figure 4:
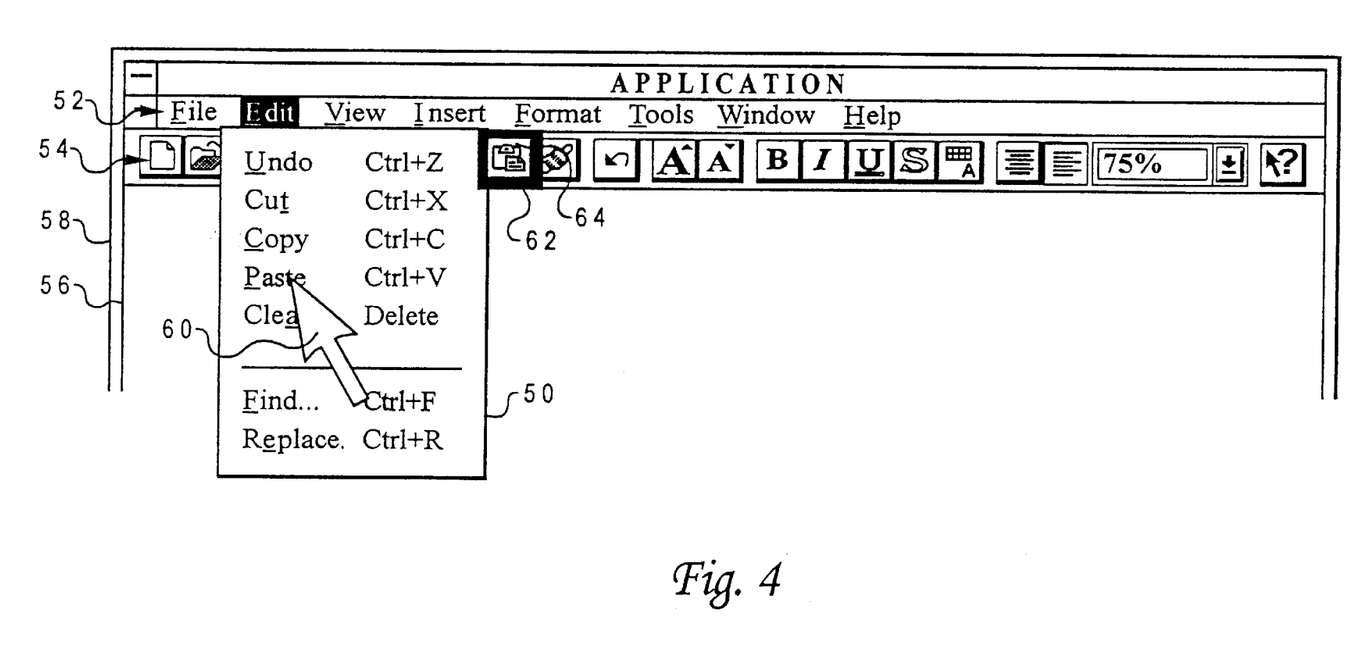
FIG. 4 is an illustration of a computer display showing a GUI designed in accordance with the present invention to provide a visual correspondence between an item on a pulldown menu and an item on a toolbar.

With reference to FIG. 4, the invention introduces the concept of feedback to users that easily and intuitively provides knowledge of the one-to-one linkage mapping between an item on a pulldown menu, such as a regular pulldown menu 50 depending from a menu bar 52, and its corresponding item on a toolbar, such as toolbar 54. Pulldown menu 50, menu bar 52 and toolbar 54 are part of the application window 56 presented by a particular application program (or the operating system itself) on a display or video monitor 58 which may be controlled by a video adapter that is connected to the processor of the computer system. This feedback feature may be used, e.g., as a training tool, so the operating system or other program providing the GUI may selectively allow the user to be in a mode that enables this function (not all users may want to see it). This mode would be under user control, as a setting which the user can toggle. Optionally, when the user exits the training mode (i.e., when it is toggled off), a subroutine ("wizard") can automatically be activated to allow the user to delete features that are not desired, such as cut/paste.

When the feedback mode is active and the user passes the pointing device selection indicator 60 (i.e., mouse pointer) over a menu bar pulldown item, if there is a corresponding item on the toolbar and that item is visible, then the item on the toolbar is highlighted or emphasized in some manner. The highlighting could be, for example, an outline around the item, color change or inversion, etc. The specific implementation of the highlighting may vary. In the implementation depicted in FIG. 4, highlighting is accomplished by outlining the icon. Pointer 60 is moved over the item "Paste" in pulldown menu 50. This tentative selection generates an outline 62 about the paste button 64. In the preferred embodiment, this highlighting is shown only while the mouse pointer is kept over the original pulldown item.

Figure 5:
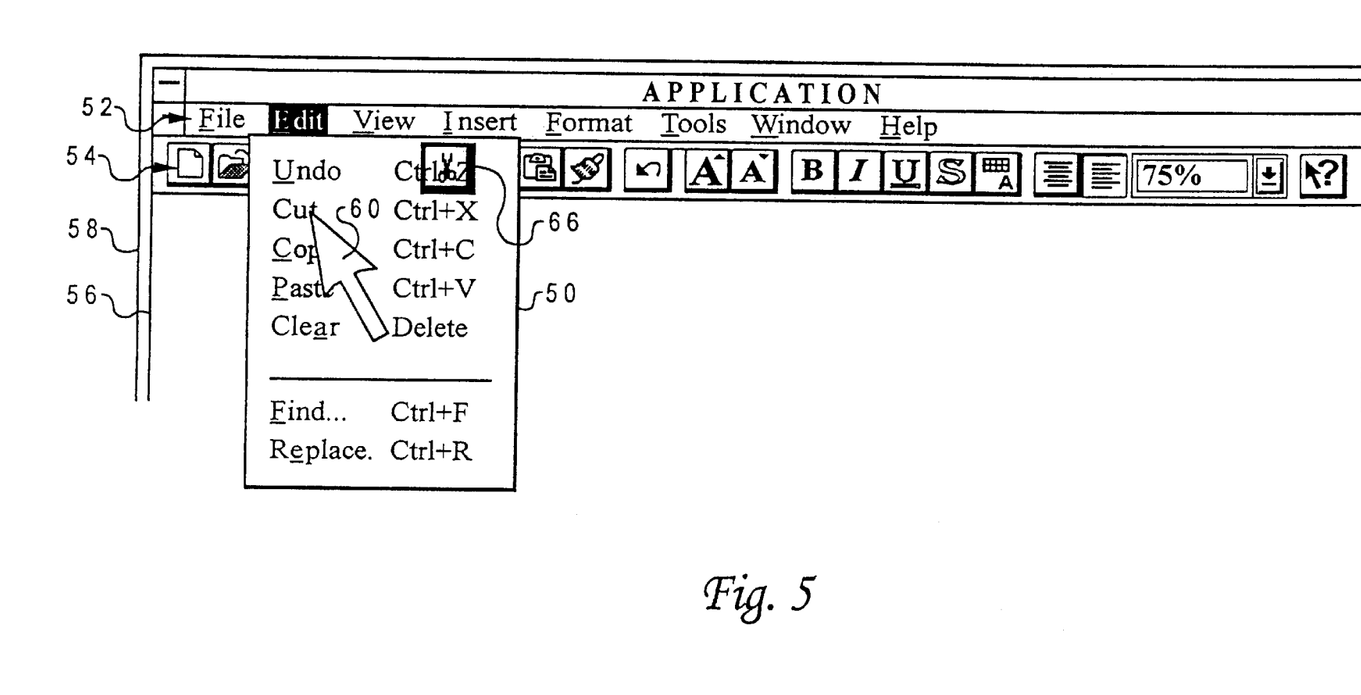
FIG. 5 is an illustration of the GUI of FIG. 4 wherein the link is shown with the toolbar item in "ghost" form.

With further reference to FIG. 5, if there is a corresponding item on the toolbar, but that item is not visible because it is obscured by the pulldown menu, the feedback can still be given, e.g., by a "ghost" image appearing under (superimposed on) the pulldown, as if the menu had a transparent portion. In the example of FIG. 5, a link for the cut button is shown with the toolbar item in ghost form 66 when pointer is placed over the "Cut" line of pulldown menu 50.

If there is no corresponding item on the toolbar for a particular pulldown, nothing happens when that pulldown is selected.

Figure 6:
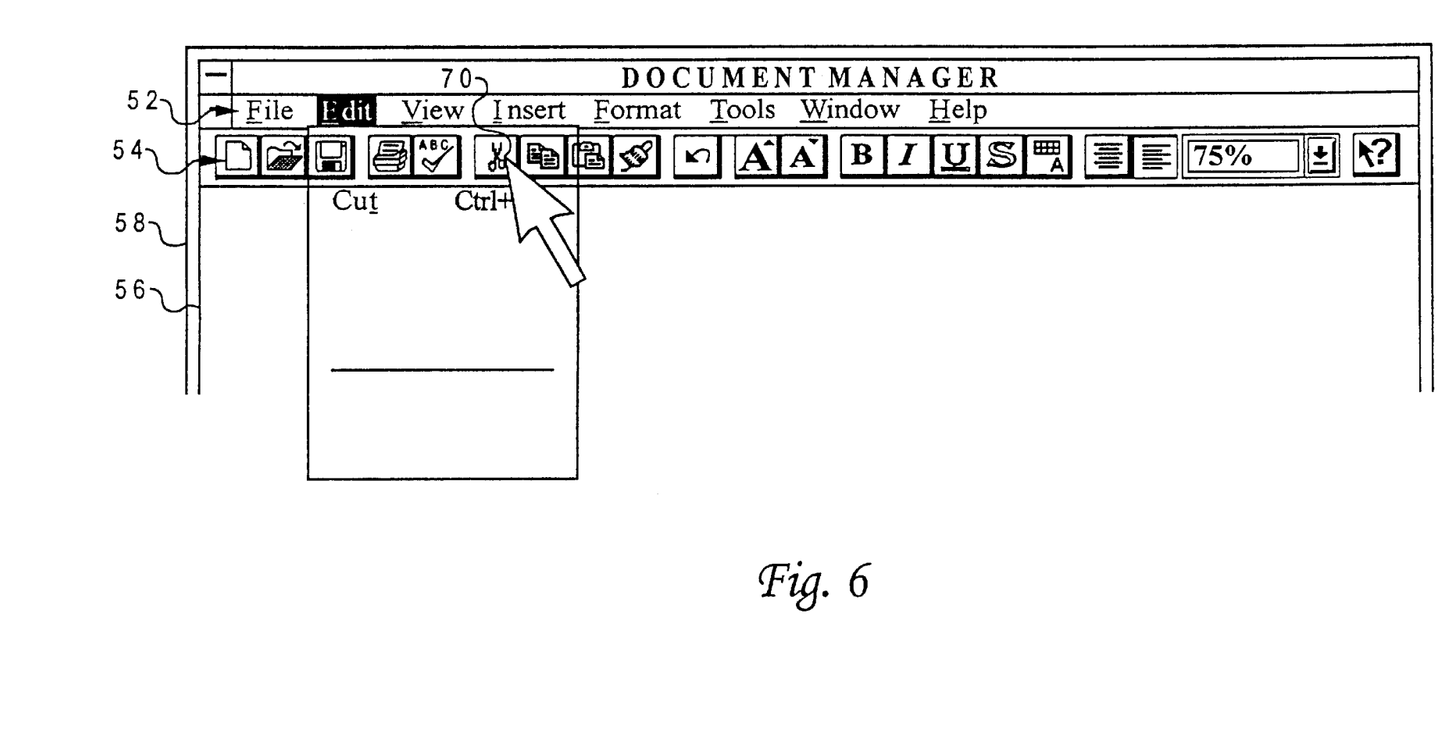
FIG. 6 is an illustration of the GUI of FIG. 4 wherein the link is shown with the pulldown menu in "ghost" form.

The present invention may also be applied in the reverse context, i.e., when the user passes the mouse pointer over a toolbar item. For example, as shown in FIG. 6, a link is provided as a temporary pulldown menu in ghost form 68 to display the "Cut" line of the menu when pointer 60 is placed over the cut button 70. The ghost pulldown menu may appear with only the relevant line displayed, or with all the lines displayed and with the corresponding item highlighted in some manner (e.g., reverse video). The ghost image of the pulldown menu preferably appears in the same location within application window 56 as it would if the corresponding item in menu bar 52 had been selected.

The present invention has several benefits. It retains current behavior and user interaction with toolbars and menu bars. The dynamic linking of items extends the functionality of the GUI without increasing its visual complexity, and allows the user to quickly and easily determine the one-to-one mapping between toolbar items and menu pulldown items. It can be easily toggled on and off, and can also easily be used in conjunction with "bubble help", commonly used in GUIs when a user passes the mouse pointer over a selectable item.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer system comprising:

a display device;

a processor; and means allowing said processor to cause said display device to depict a graphical user interface including a window having a toolbar with associated items and a menu bar having at least one pulldown menu with associated items, said means further providing a visual correspondence between an item on said pulldown menu and the equivalent item on said toolbar, by changing a visual appearance of a first one of said pulldown menu item and said toolbar item in response to placement of a graphical pointer over a second one of said pulldown menu item and said toolbar item.

2. The computer system of claim 1 wherein said means provides said visual correspondence when the graphical pointer is placed over an item on said pulldown menu.

3. The computer system of claim 1 wherein said means provides said visual correspondence when the graphical pointer is placed over an item on said toolbar.

4. The computer system of claim 1 wherein said means provides said visual correspondence by highlighting said item on said toolbar.

5. The computer system of claim 1 wherein said means provides said visual correspondence by providing a ghost image of said item on said toolbar.

6. The computer system of claim 1 wherein said means provides said visual correspondence by providing a ghost image of said pulldown menu.

7. The computer system of claim 2 wherein said means further provides said visual correspondence when the graphical pointer is placed over an item on said toolbar.

8. The computer system of claim 4 wherein said item on said toolbar is highlighted by outlining said item on said toolbar.

9. The computer system of claim 4 wherein said means further provides said visual correspondence by providing a ghost image of said pulldown menu.

10. The computer system of claim 5 wherein said means further provides said visual correspondence by providing a ghost image of said pulldown menu.

11. The computer system of claim 6 wherein said item on said pulldown menu appears highlighted in said ghost image of said pulldown menu.

12. A method of providing a visual correspondence between an item on a pulldown menu and an item on a toolbar in a graphical user interface depicted on a display device of a computer system, the method comprising the steps of:

moving a graphical pointer over a selected toolbar item in response to actuation of a pointing device; and displaying a temporary pulldown menu containing a pulldown item corresponding to the selected toolbar item and displaying the pulldown menu item as a ghost image in response to said moving step.

13. The method of claim 12 wherein the graphical user interface is programmed to selectively enable a mode allowing the visual correspondence, and further comprising the step of enabling said mode.

14. The method of claim 12 wherein the graphical user interface creates a regular pulldown menu when a corresponding item on a menu bar is selected, and further comprising the step of providing another visual correspondence with the selected toolbar item when the graphical pointer is placed over a corresponding item on the regular pulldown menu.

15. The method of claim 12 wherein:

the graphical user interface creates a regular pulldown menu at a regular location when a corresponding item on a menu bar is selected; and said displaying step displays the temporary pulldown menu at the regular location.

16. The method of claim 12 wherein said displaying step includes the step of highlighting the corresponding pulldown item in the temporary pulldown menu.

17. A method of providing a visual correspondence between an item on a toolbar and an item on a pulldown menu in a graphical user interface depicted on a display device of a computer system, the method comprising the steps of:

moving a graphical pointer over a selected item in the pulldown menu in response to actuation of a pointing device; and highlighting a corresponding toolbar item in response to said moving step.

18. The method of claim 17 wherein the graphical user interface is programmed to selectively enable a mode allowing the visual correspondence, and further comprising the step of enabling said mode.

19. The method of claim 17 further comprising the step of providing another visual correspondence with the item in the pulldown menu when the graphical pointer is placed over the corresponding toolbar item.

20. The method of claim 17 wherein the corresponding toolbar item is obscured by the pulldown menu and said highlighting step is accomplished by displaying a ghost image of the corresponding toolbar item.

21. The method of claim 17 wherein the toolbar item is highlighted by outlining the toolbar item.

22. A computer program product comprising:

a storage medium; and program instructions stored on said storage medium for allowing a processor to cause a display device to depict a graphical user interface including a window having a toolbar with associated items and a menu bar having at least one pulldown menu with associated items, said graphical user interface further providing a visual correspondence between an item on said pulldown menu and the equivalent item on said toolbar, by changing a visual appearance of a first one of said pulldown menu item and said toolbar item in response to placement of a graphical pointer over a second one of said pulldown menu item and said toolbar item.

23. The computer program product of claim 22 wherein said graphical user interface includes the graphical pointer which moves in response to actuation of a pointing device connected to the processor, and said graphical user interface provides said visual correspondence when the graphical pointer is placed over an item on said pulldown menu.

24. The computer program product of claim 22 wherein said graphical user interface includes the graphical pointer which moves in response to actuation of a pointing device connected to the processor, and said graphical user interface provides said visual correspondence when the graphical pointer is placed over an item on said toolbar.

25. The computer program product of claim 22 wherein said graphical user interface provides said visual correspondence by highlighting said item on said toolbar.

26. The computer program product of claim 22 wherein said graphical user interface provides said visual correspondence by providing a ghost image of said item on said toolbar.

27. The computer program product of claim 22 wherein said graphical user interface provides said visual correspondence by providing a ghost image of said pulldown menu.

* * * * *